US010384433B2

(12) United States Patent
Rodriguez (10) Patent No.: US 10,384,433 B2
(45) Date of Patent: Aug. 20, 2019

(54) APPARATUS AND METHOD TO EXTRACT AN OBJECT FROM A BASE SURFACE USING VIBRATION

(71) Applicant: Suma Consulting & Investments, Inc., Miramar, FL (US)

(72) Inventor: Mauricio Ricardo Rodriguez, Fort Lauderdale, FL (US)

(73) Assignee: Suma Consulting and Investments, Inc., Miramar, FL (US)

( * ) Notice: Subject to any disclaimer, the term of this patent is extended or adjusted under 35 U.S.C. 154(b) by 0 days.

(21) Appl. No.: 15/368,977

(22) Filed: Dec. 5, 2016

(65) Prior Publication Data

US 2017/0165953 A1  Jun. 15, 2017

Related U.S. Application Data

(60) Provisional application No. 62/265,987, filed on Dec. 11, 2015.

(51) Int. Cl.
*B32B 43/00* (2006.01)
*B32B 37/10* (2006.01)
(Continued)

(52) U.S. Cl.
CPC ........ *B32B 43/006* (2013.01); *B32B 37/1018* (2013.01); *E04G 23/006* (2013.01);
(Continued)

(58) Field of Classification Search
CPC . B32B 43/006; B32B 38/10; Y10T 156/1121; Y10T 156/1922; Y10T 156/1184; Y10T 156/1967
(Continued)

(56) References Cited

U.S. PATENT DOCUMENTS 2,234,102 A   3/1941 Andres
3,033,382 A * 5/1962 Noble .................. B66C 1/0212
                                                    212/281
(Continued)

FOREIGN PATENT DOCUMENTS

CA    2050772 A1   3/1993
CN   104912313 A   9/2015
(Continued)

*Primary Examiner* — Mark A Osele
*Assistant Examiner* — Nickolas R Harm
(74) *Attorney, Agent, or Firm* — Griffin C. Klema (57) ABSTRACT

An extractor system for extracting an object secured to another object or a base surface is disclosed, which may include an oscillator, an attachment base, and an oscillation control mechanism to limit the transmission of oscillation forces after the object has become unsecured, and preserve the target object in good condition. The attachment base may be a vacuum suction cup or temporary adhesive. The control system may be a mechanical lifting system or an electronic control adapted to cease or minimize application of vibrational force when the object becomes unsecured. Methods of extracting an object or separating two objects secured to each other are also disclosed, including identification or creation of partial unbonded areas beneath the target object to initiate the de-bonding process prior to application of vibrational forces.

1 Claim, 10 Drawing Sheets

(51) Int. Cl.
*E04G 23/00* (2006.01)
*B32B 38/10* (2006.01)
*B32B 38/18* (2006.01)

(52) U.S. Cl.
CPC ........... *B32B 38/10* (2013.01); *B32B 38/1858* (2013.01); *B32B 2471/00* (2013.01); *B32B 2607/02* (2013.01); *Y10T 156/1121* (2015.01); *Y10T 156/1184* (2015.01); *Y10T 156/1922* (2015.01); *Y10T 156/1967* (2015.01)

(58) Field of Classification Search
USPC ................ 156/705, 754, 929, 940, 717, 762
See application file for complete search history.

(56) References Cited

U.S. PATENT DOCUMENTS

| | | | |
|---|---|---|---|
| 3,061,351 A | 10/1962 | Johnson | |
| 3,085,786 A | 4/1963 | Deuss | |
| 3,643,992 A | 2/1972 | Jacobucci | |
| 3,719,543 A * | 3/1973 | Harris | B01J 19/10 156/73.1 |
| 4,053,958 A | 10/1977 | Taylor | |
| 4,182,000 A | 1/1980 | Fairbairn | |
| 4,451,196 A * | 5/1984 | Harada | B25J 9/1065 198/468.4 |
| 4,557,659 A * | 12/1985 | Scaglia | B65G 47/91 254/270 |
| 4,749,219 A * | 6/1988 | Bolle, Jr. | B25J 15/0616 271/103 |
| 4,893,451 A | 1/1990 | Valente | |
| 4,983,809 A | 1/1991 | Maiette | |
| 5,013,092 A | 5/1991 | Kulhawy | |
| 5,076,305 A | 12/1991 | Williams | |
| 5,098,506 A | 3/1992 | Brown | |
| 5,296,083 A * | 3/1994 | Petino | B08B 7/0092 134/17 |
| 5,533,790 A | 7/1996 | Weiland | |
| 5,641,206 A | 6/1997 | Craft | |
| 5,867,965 A | 2/1999 | Pilz | |
| 6,027,174 A | 2/2000 | Gerbasi | |
| 6,558,493 B1 * | 5/2003 | Ledger | B26F 3/00 156/712 |
| 6,716,297 B2 | 4/2004 | Essig | |
| 6,839,959 B1 * | 1/2005 | Hosotani | H01L 21/67144 29/721 |
| 6,994,403 B2 | 2/2006 | York | |
| 7,493,931 B2 | 2/2009 | Deiderich | |
| 8,151,424 B2 | 4/2012 | Dimoff | |
| 8,470,129 B1 * | 6/2013 | Wang | B32B 38/10 156/705 |
| 9,074,381 B1 | 7/2015 | Drew | |
| 2004/0070221 A1 | 4/2004 | Hoehn | |
| 2005/0284998 A1 * | 12/2005 | Tsay | G11B 33/00 248/309.3 |
| 2007/0006547 A1 | 1/2007 | York | |
| 2009/0032186 A1 * | 2/2009 | Cheung | H01L 21/67132 156/705 |
| 2010/0178134 A1 * | 7/2010 | Dimoff | B66F 3/08 414/10 |
| 2011/0010908 A1 * | 1/2011 | George | H01L 21/67092 29/426.2 |
| 2013/0032297 A1 * | 2/2013 | Coto | B32B 43/006 156/705 |
| 2014/0238617 A1 * | 8/2014 | Shair | B32B 43/006 156/708 |
| 2015/0083340 A1 * | 3/2015 | Price | B32B 43/006 156/701 |
| 2015/0319893 A1 * | 11/2015 | Ohno | B32B 43/006 156/702 |
| 2015/0325465 A1 * | 11/2015 | Iwata | B32B 38/1858 156/703 |
| 2015/0328872 A1 * | 11/2015 | Koyanagi | B23K 26/0853 156/73.1 |
| 2015/0348818 A1 * | 12/2015 | Tachioka | H01L 21/6835 156/247 |

FOREIGN PATENT DOCUMENTS

| | | |
|---|---|---|
| CN | 204899165 U | 12/2015 |
| CN | 205171968 U | 4/2016 |
| CN | 205290869 U | 6/2016 |
| DE | 3039698 A1 | 5/1982 |
| DE | 10047443 A1 | 4/2002 |

* cited by examiner

APPARATUS AND METHOD TO EXTRACT AN OBJECT FROM A BASE SURFACE USING VIBRATION

RELATED APPLICATION

The present application claims benefit under 35 U.S.C. Sec. 119 to U.S. provisional patent application Ser. No. 62/265,987 filed Dec. 11, 2015. The foregoing application is hereby incorporated by reference into the present application in its entirety.

FIELD OF THE DISCLOSURE

The present disclosure generally relates to systems and methods to facilitate removal of an object attached to a substrate or another object, such that the object, once unsecured, is in good condition and potentially suitable for re-use.

BACKGROUND

A wide variety of objects are adhered or bonded to other objects or surfaces without the use of mechanical fasteners. Depending on the type of object being secured, various fixatives suitable to the particular application are employed, such as mortars, mastics, glues, epoxies, tapes, cements, polymers, cyanoacrylates, urethanes, silicones, solders, and even paint, among others.

In the construction and building context, decorative, protective, or functional coverings are used as a final finished surface on floors, walls, ceilings, and the ground. Such finish coverings typically include ceramic tile, porcelain tile, clay tile, glass tile, stone, brick, wood, or other ridged or semi-ridged material. Such finish coverings are often composed of multiple individual units, installed to form a continuous surface. Finish coverings are also commonly installed both inside or outside a building enclosure, and are often bonded or adhered to a structural substrate with the intent that the finish covering be permanently fixed in place. Some materials and objects are very durable, with long expected life, and secured to surfaces with the intent they be permanently affixed. These materials may be unique to a particular installation either because of innate qualities of the covering material from a particular batch or manufacturing run, because of weatherization, because of wear, or because the covering material is vintage, antique, or simply has been discontinued from manufacture and no longer available.

SUMMARY

The following presents a simplified summary of the disclosure in order to provide a basic understanding of some aspects of the disclosure. This summary is not an extensive overview of the disclosure. It is intended neither to identify key or critical elements of the disclosure nor to delineate the scope of the disclosure. Its sole purpose is to present some concepts of the disclosure, in accordance with the disclosure, in a simplified form as a prelude to the more detailed description presented later.

In one embodiment of the disclosure an extractor system is provided which includes an attachment base connectable with a target object, where the target object is secured to a base surface, and an oscillator provided on the attachment base operable to transmit oscillation forces from the oscillator to the target object through the attachment base, and where the oscillation forces unsecure the target object in good condition from the base surface.

In another embodiment of the disclosure, an extractor system is provided which includes a first attachment base connectable with a target object, where the target object is secured to a base surface. The first attachment base comprises a suction cup operable to generate a vacuum suction force between the first attachment base and the target object. A second attachment base comprising a suction cup operable to generate a vacuum suction force between the second attachment base and the target object, where the second attachment base is connectable with the target object. The second attachment base is located at a distance from the first attachment base. An oscillator is connected to the first attachment base and is operable to transmit oscillation forces from the oscillator to the target object through the first attachment base. A lifting device includes at least two surface-engaging supports, each spaced from the target object. The lifting system also includes a cross member connectable to each surface-engaging support, a first spring connectable between the cross member and the first attachment base, operable to apply tension between the cross member and the first attachment base. Similarly, a second spring connectable between the cross member and the second attachment base operable to apply tension between the cross member and the second attachment base. The oscillation forces unsecure the target object from the base surface and the lifting device lifts the target object away from the base surface.

A further embodiment is an extractor system comprising a means for generating oscillation forces, and a means for transmitting those oscillation forces to a target object which is secured to a base surface. A means for sensing a state of the target object and controlling the transmission of oscillation forces.

Another embodiment is a method of extracting a target object secured to a base surface comprising the steps of providing an oscillator capable of being detachably coupled to the target object, operating the oscillator to apply oscillation forces to the target object for a period of time sufficient to cause the target object to become unsecured from the base surface.

Yet another embodiment is a method of extracting a target object secured to a base surface comprising the steps of gaining access to an interface between the target object and the base surface, and creating an area at the interface where the target object is partially unsecured from the base surface. Then, providing an oscillator capable of being detachably coupled to the target object, and coupling it to the target object proximally to the area where the target object is partially unsecured from the base surface. Next, operating the oscillator to apply oscillation forces to the target object while monitoring the state of the target object while oscillation forces are being applied. Continuing to apply for a period of time sufficient to cause the target object to become unsecured from the base surface and then preventing the oscillation forces from being transmitted beyond the target object approximately simultaneously when the target object has become unsecured from the base surface.

The following description and the annexed drawings set forth certain illustrative aspects of the disclosure. These aspects are indicative of only some of the various ways in which the principles of the disclosure may be employed, and the present disclosure is intended to include all such aspects and their equivalents. Other advantages and novel features of the disclosure will become apparent from the following description when considered in conjunction with the drawings.

BRIEF DESCRIPTION OF THE DRAWINGS

The disclosure can be readily understood by considering the following detailed description in conjunction with the accompanying drawings, in which.

DETAILED DESCRIPTION

The following detailed description and the appended drawings describe and illustrate various embodiments of the disclosure solely for the purpose of enabling one of ordinary skill in the relevant art to make and use the disclosure. As such, the detailed description and illustration of these embodiments are purely exemplary in nature and are in no way intended to limit the scope of the disclosure, or its protection, in any manner. It should also be understood that the drawings are not to scale and in certain instances details have been omitted, which are not necessary for an understanding of the present disclosure, such as conventional details of fabrication and assembly.

One embodiment of an extractor system, in accordance with the disclosure, may include an attachment base connectable with a target object, where the target object is secured to a base surface, and an oscillator provided on the attachment base operable to transmit oscillation forces from the oscillator to the target object through the attachment base, and where the oscillation forces unsecure the target object, intact and undamaged, from the base surface.

In some embodiments, the oscillator may comprise a pneumatically driven vibrator. In other embodiments, the oscillator may comprise an electrically operated motor vibrator.

With respect to the attachment base, some embodiments could comprise a vacuum suction cup. In other embodiments, the attachment base may comprise a heat source operable to melt an adhesive. Other embodiments may include an adhesive capable of attaching the oscillator to the target object, or a clamping system capable of gripping the target object by its edges.

Other embodiments of the extractor system may include a void creation device adaptable to partially unbond the target object from the base surface. Void creation devices might include blades attached to a vibrational tool and capable of mechanically remove adhesive. Void creation devices may also include a flexible wire having abrasive coating and adaptable to mechanically removing setting material between the target object and the base surface. Alternatively, void creation devices may be join disruption devices, or devices capable of partially unsecuring the target object from the base surface prior to the application of oscillation forces. Devices adaptable to create a void include ablation, etching, cutting, or causing physical disassociation between the target object from the base surface near an edge of target object. Such devices may vary depending on how the target object is secured to the base surface, and how a user can gain access to the join between the target object and substrate. Sometimes, adjacent objects are in close proximity to the target object, and smaller or incremental tooling may be required to disrupt a portion of the adhesive join. Liquid chemical etching or a combination of chemical and physical removal are also contemplated so as to achieve the desired functions of void creation device.

Various embodiments of the extractor system may constitute a control system. The control system might be a lifting device adaptable to lift the target object away from the base surface after the target object becomes unsecured, or an attenuator placed proximate to an edge of the target object and operable to limit the transmission of the oscillation forces after the target object has become unsecured. Attenuators could be rubber or polymer wedges sized to fit into the space between the target object and adjacent non-target objects. Attenuators could also be made of fabric or other resilient material capable of absorbing repeated impacts. Or the control system could be electronic circuitry operable to receive information from a sensor which is adaptable to detect a state of the target object capable of generating and sending a signal about the state of the target object to the electronic circuitry, the electronic circuitry operable in response to the signal sent by the sensor, and the electronic circuitry in communication with the oscillator.

In some embodiments, extractor system may sense and monitor a state of the target object which, in some embodiments, may be the target object secured to the base surface, the target object while oscillation forces are being applied, or the target object unsecured from the base surface.

In other embodiments, the electronic circuitry of extractor system may include a general purpose computer adaptable to monitor and store data about the state of the target object, and to control the oscillation forces.

In yet another embodiment of the disclosure, an extractor system may include a first attachment base connectable with a target object, where the target object is secured to a base surface. The first attachment base could comprise a suction cup operable to generate a vacuum suction force between the first attachment base and the target object. A second attachment base could comprise a suction cup operable to generate a vacuum suction force between the second attachment base and the target object, where the second attachment base is likewise connectable with the target object and located at a distance from the first attachment. An oscillator may be connected to the first attachment base and may transmit oscillation forces from the oscillator to the target object through the first attachment base. A lifting device could include surface-engaging supports, with each surface-engaging support spaced from the target object. The lifting system may also include a cross member connectable to each surface-engaging support. A first spring may be connectable between the cross member and the first attachment base so as to apply tension between the cross member and the first attachment base. In similar fashion, a second spring may be connectable to the cross member and the second attachment base operable to apply tension between the cross member and the second attachment base. When the oscillation forces unsecure the target object from the base surface, the lifting device lifts the target object away from the base surface.

A further embodiment, in accordance with the disclosure, may be an extractor system comprising means for generating oscillation forces and having a means for transmitting the oscillation forces to a target object that is secured to a base surface. It may further include a means for sensing a state of the target object and a means for controlling the transmission of oscillation forces.

Yet another embodiment may include a method of removing a target object secured to a base surface comprising the steps of providing an oscillator capable of being detachably coupled to the target object, operating the oscillator to apply vibrational forces to the target object for a period of time sufficient to cause the target object to become unsecured from the base surface. In some embodiments the steps of the method may include locating an area beneath the target object where the target object is most weakly secured to the base surface and coupling the oscillator to the target object proximate to the area beneath the target object where the target object is most weakly secured. Still other embodiments of the method may include the steps of gaining access to an interface between the target object and the base surface, creating an area at the interface where the target object is partially unsecured from the base surface, and coupling the oscillator to the target object proximately to the area where the target object is partially unsecured. An interface may be an area where an adhesive secures the target object to the base surface, or it may be a join or mating surface existing between the target object and the base surface. The method may include coupling the oscillator to the target object using vacuum suction and applying vacuum suction to hold the oscillator to the target object while the oscillation forces are being applied to the target object or coupling the oscillator to the target object using a clamping device or a selectively reversible adhesive.

The method could also include the step of controlling the transmission of oscillation forces. Some embodiments of the step of controlling the transmission of oscillation forces may comprise providing a lifting device, coupling it to the target object, and lifting the target object away from the base surface once the target object has become unsecured. In other embodiments, the step of controlling the transmission of oscillation forces may comprise monitoring a state of the target object and ceasing the application of oscillation forces after the target object has become unsecured.

In still yet another embodiment, in accordance with the disclosure, may be a method of extracting a target object from a plurality of objects, each object secured to a base surface comprising the steps of gaining access to an interface between the target object and the base surface, locating an area beneath the target object where the target object is most weakly secured to the base surface. Alternatively, creating an area at an interface between the target object and the base surface such that the target object is partially unsecured from the base surface. An oscillator may then be provided which is capable of being detachably coupled to the target object. The oscillator may be coupled to the target object proximally to the area where the target object is most weakly secured to the base surface, or to the area at an interface between the target object and base surface which has been partially unsecured from the base surface. Optionally, multiple oscillators may be attached to multiple areas on the target object either where the target object is most weakly secured to the base surface, or where the area at an interface between the target object and base surface which has been partially unsecured from the base surface. Then operating the oscillator to apply oscillation forces to the target object, while monitoring the state of the target object while oscillation forces are being applied. Continuing to apply oscillation forces to the target object for a period of time sufficient to cause the target object to become unsecured from the base surface, with the final step may be preventing the oscillation forces from being transmitted beyond the target object approximately simultaneously when the target object has become unsecured from the base surface.

Figure 1:
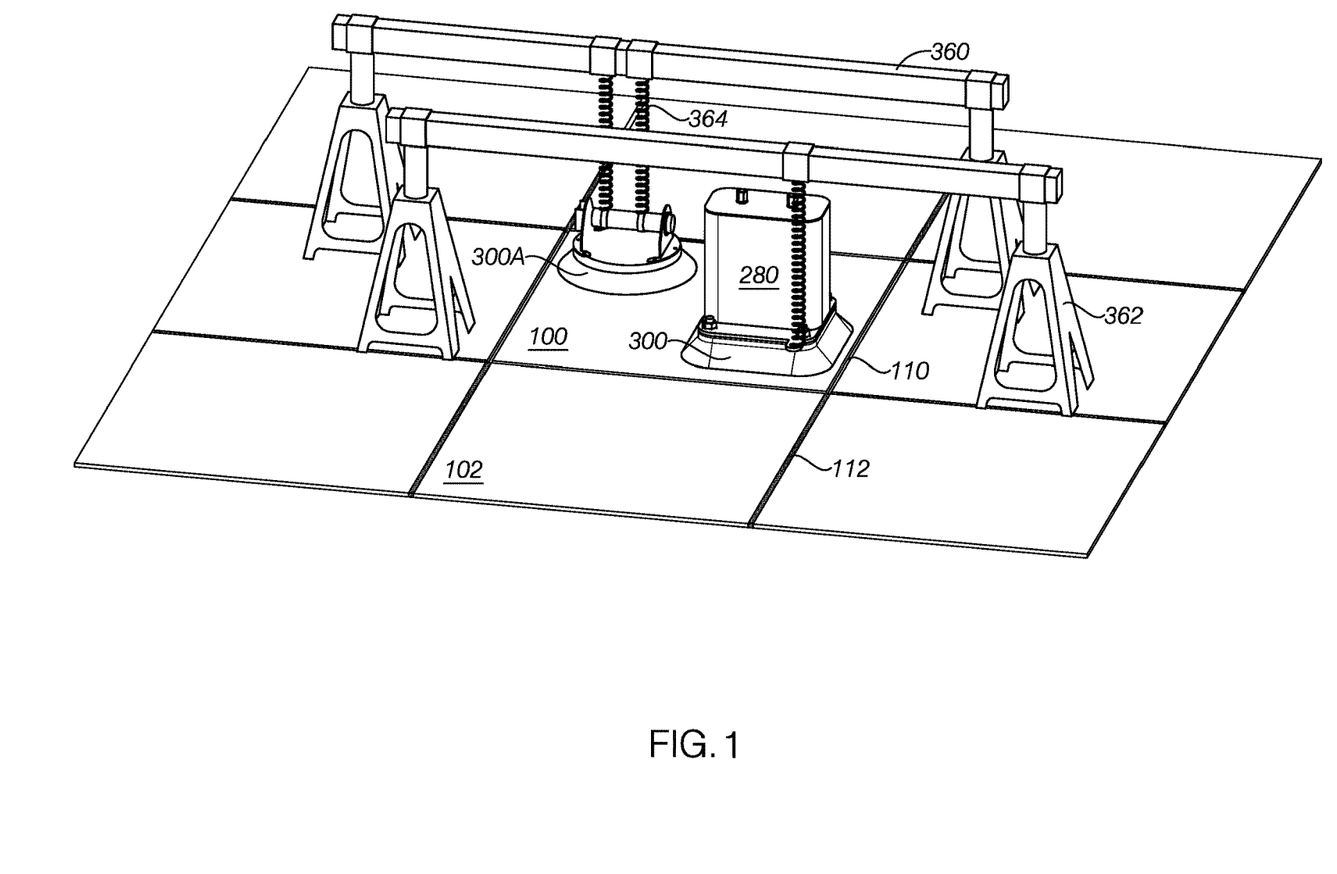
FIG. 1 illustrates a perspective view of an embodiment of an extractor system in accordance with the disclosure comprising a pneumatically-driven oscillator and vacuum attachment bases together with a mechanical lifting-based pantry control system.

Now, with reference to FIG. 1, an embodiment of the extractor system is provided in accordance with the disclosure. Extractor system may include oscillator 280 and a first attachment base 300. A control system may be provided comprising a lifting device that includes a second attachment base 300A to provide even lifting of target object 100 away from base surface after target object has been freed from base surface. Control system may include lateral surface engaging supports 362 provided to support cross members 360 which are positioned over target object 100. Two surface engaging supports 362 and one cross member 360 may be described as a gantry. Control system may also include springs 364 provided to apply tension between the attachment bases 300 and 300A such that as soon as target object becomes unsecured from base surface, target object is lifted up and away from base surface and vibrational forces are controlled by isolation of the target object from the base surface and any adjacent non-target objects. Varying oscillators and attachment bases are contemplated within the disclosure depending on the characteristics of target object, such as the target object's relative position, mass, geometry, material, design, or construction, so as to remove the target object in good condition. Removal of the target object may even be accomplished without any damage to the target object. Non-destructive extraction of target objects may be re-used in new locations, or re-attached to the base surface from which it was originally removed.

Target objects could be positioned level with the ground, normal to gravitational forces, along a vertical wall, to a ceiling, or on a non-level or non-normal to gravity surface. A target object could be attached to another object, the two objects secured to each other but not another surface or object. A target objects' shape may vary from known geometries such as planar circles, squares, rectangles, triangles, trapezoids, combinations of such shapes, or irregular edges. Target objects may be a matrix or array of individual objects. Target objects may also be non-planar, such as having a conical, cubical, hemispherical, or irregular shape. Characteristics of target object may dictate selection of an oscillator capable of transmitting suitable frequency, intensity, and direction of vibrational forces.

A target object may be secured to base surface through various types of adhesives, such as friction adhesion, cementitious mortars, mastics, paints, epoxies, silicones, caulks. The type of adhesive securing the target object to the base surface may influence selection of the oscillator to achieve embrittling, fracturing, harmonic resonance, liquefaction, or shearing of the adhesive so as to achieve the desired functions of extractor system. Target objects harvested from a base surface and reclaimed from their original installation may be unique items, suitable for re-use in entirely new locations.

Some embodiments may contemplate sensors disposed to monitor a state of the target object, the extractor system's components, or the environment surrounding the target object. A state of the target object may include one or many inherent characteristics at a given time. Many different devices and methods of sensing, measuring, and monitoring a state of the target object are contemplated by the disclosure. A state of the target object may be an area where the strength of adhesion to a base surface is at its minimum, or an area where the target object is partially unsecured to the base surface. A state of the target object may also be its mass, position, density, conductivity, porosity, or inherent harmonics. A state of target object may be sensed and monitored by sensors of the control system, such as through sonar, radar, accelerometer, gyroscope, thermometer, or chemosensor. A state of a target object may change during the application of repetitive forces, such as if target object becomes fractured, deformed, or unsecured. A state of a target object may be its acceleration and position while still secured to a base surface. A state of the target object may also be its acceleration and position after it has become completely unsecured from the base surface. A continuum of states may exist between a target object's first state while secured, and a second state once unsecured. Certain embodiments of the control system may include observing a target object's state before, during, or after oscillation forces are applied, or monitoring for changes in a state so as to achieve the desired functions of control system.

A sensor may generate a signal capable of communicating data and information about a state of the target object, a state of the extractor system or any of its individual components, or a state of the environment surrounding the target object. These signals may be received by electronic circuitry which may then control the oscillator, attachment base, or provide information to a user. Multiple sensors may be provided.

In another embodiment, for a smooth surface ceramic or porcelain tile embedded in mortar atop a cement slab, a vacuum suction attachment base may hold an oscillator to the tile while oscillation forces are delivered to the tile from a pneumatic piston oscillator, which may produce the repetitive forces necessary to remove the tile from the slab.

In FIG. 1, attachment bases 300 and 300A hold oscillator 280 to the surface of target object 100 through vacuum suction. Some embodiments may use a venturi to generate vacuum suction, while others may use a pump. Instead of a venturi, other methods and structures of creating a vacuum, including but not limited to a vacuum generator, mechanical pump, or manual pump, are also contemplated by the disclosure to achieve the desired function of holding an oscillator to a target object. Vacuum engagement may be enhanced with the use of an attachment such as a gel or liquid applied to the surface of target object 100 prior to engagement of the vacuum.

Additional embodiments of control system may employ fewer or greater cross members, lateral supports, or springs arranged to achieve lifting of the target object away from the base surface or nearby non-target objects without damaging the target object or adjacent objects.

Figure 2:
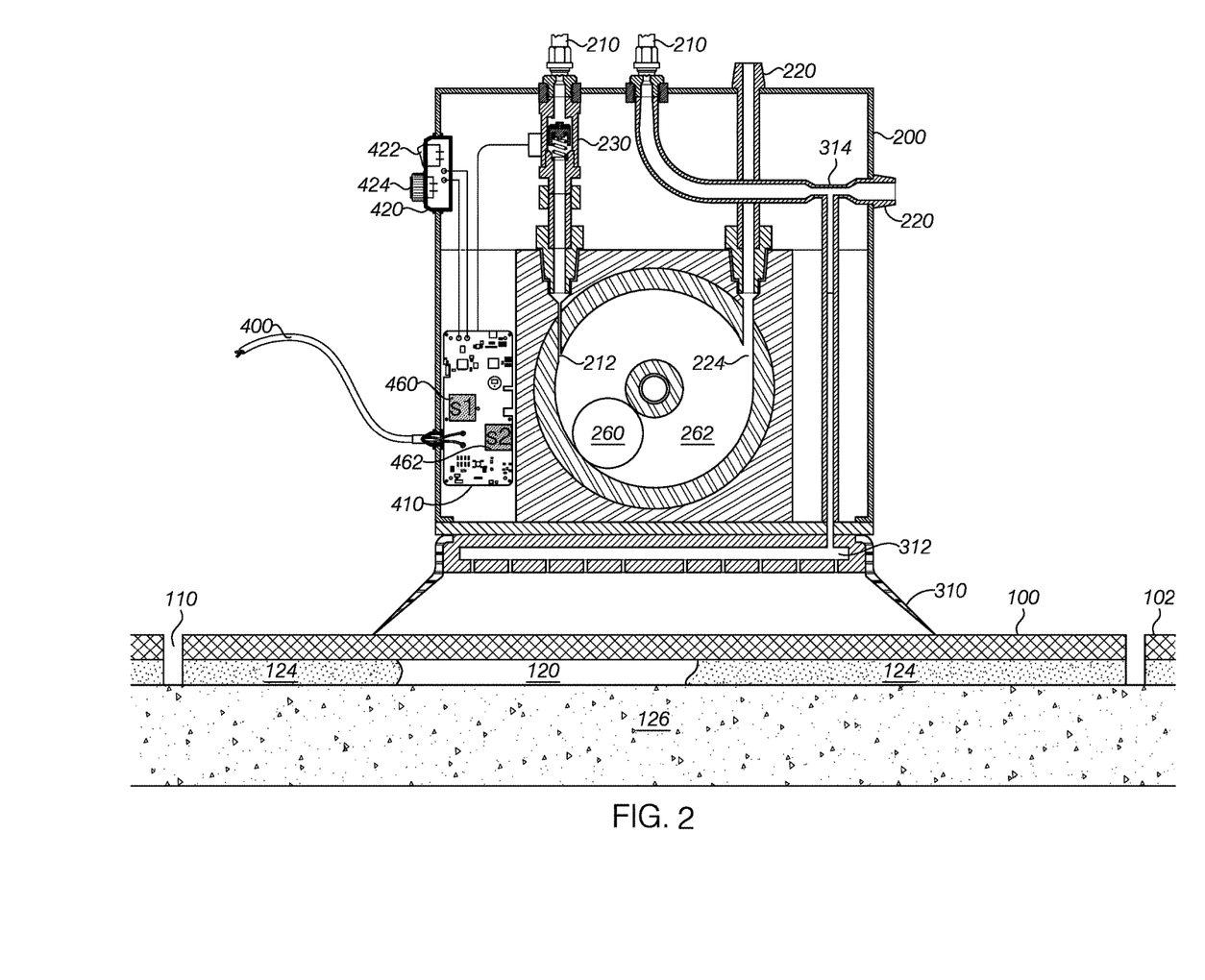
FIG. 2 illustrates a lateral cross sectional view of one embodiment of an extractor system in accordance with the disclosure comprising a pneumatic ball vibrational source, a venturi vacuum suction attachment member, and electronic controls which monitor the state of the target object and control operation of the vibrational source.
Figure 3:
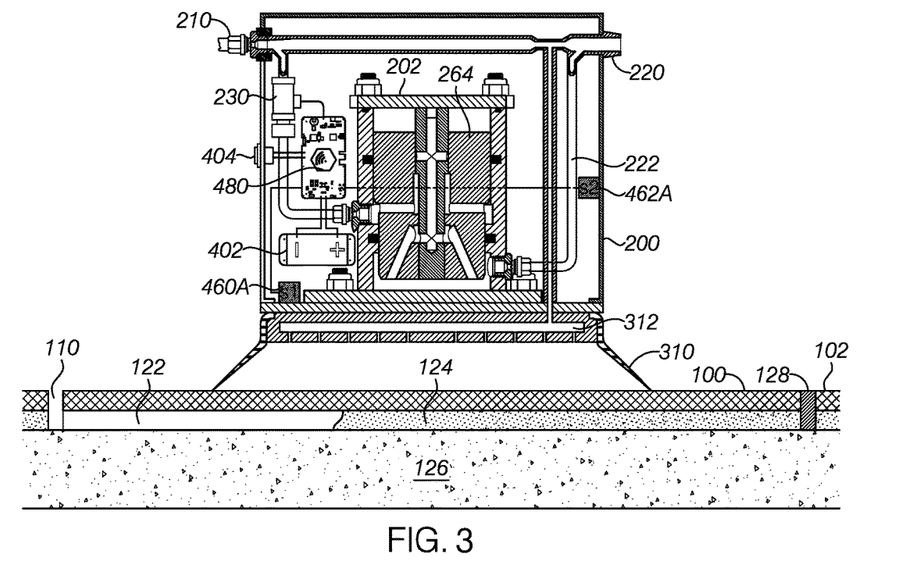
FIG. 3 illustrates a lateral cross sectional view of another embodiment of an extractor system.
Figure 4:
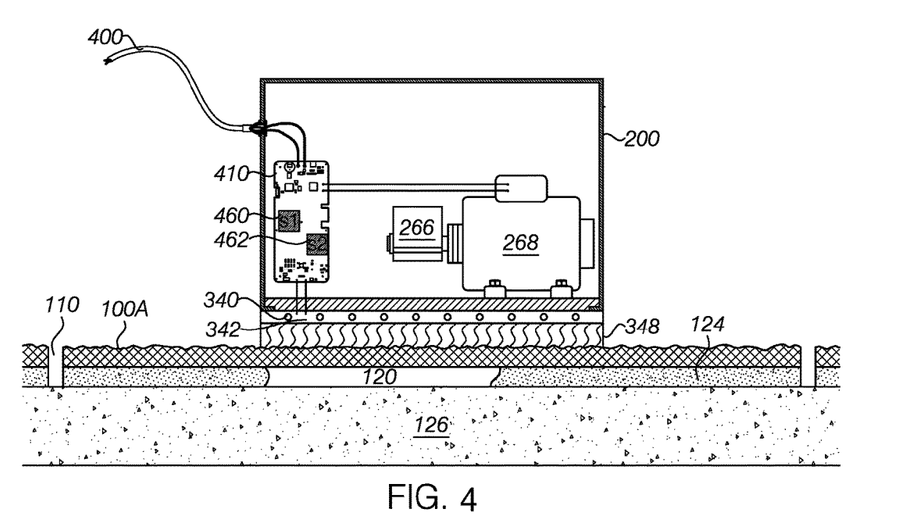
FIG. 4 illustrates a lateral cross sectional view of yet another embodiment of an extractor system based entirely as an electronically actuated and controlled system.

With reference to FIGS. 2, 3, and 4, embodiments of the extractor system are provided in accordance with the disclosure. Extractor system may include a housing 200 within which may be a pneumatic ball vibrator having an air inlet 210, passing through a solenoid valve 230 before entering the ball raceway 262, and acting upon the ball 260. Air exits the ball raceway at opening 224 before being exhausted to the atmosphere via outlet 220. A second air inlet 210 passes air through venturi 314 which produces vacuum suction within pressure equalization chamber 312 before generating a vacuum between the extractor system and target object 100 via suction cup 310. Air is exhausted to the atmosphere from venturi 314 through air outlet 220.

The control system may include electrical circuitry for controlling extractor system, and may be provided within housing 200, and may, in some embodiments, include a printed circuit board ("PCB") 410. PCB 410 may have connected to it a first sensor 460 and a second sensor 462. A control panel 420 may be provided on the exterior of housing 200 in electrical connection to PCB 410 to permit a user to operate and control the extractor system. Control panel 420 may include toggle switch 422 and rotary knob 424. PCB 410 may include a microcontroller, a plurality of memory chips, a plurality of capacitors, a plurality of transistors, a plurality of memristors, and a plurality of resistors, or any combination thereof in order to accomplish various functions described herein. Additionally, the control system may include microchip processors and memory to store software programs. Optical computing systems capable of achieving the control system functions are also contemplated.

In FIG. 3, control system may be remotely monitored or operated by a user through wireless radio 480 electrically connected to the PCB. Any known or to be discovered wireless communication radios are contemplated within the disclosure in order to achieve the desired functions of control system. Communications between the user and the control system may include monitoring vibrational frequencies, setting or adjusting amplitude and intensity of oscillation, initiating or terminating the application of oscillation forces, providing information to the user about the state of airflow through the system, or battery charge state. Solenoid valve 230 may be electrically connected to the PCB in order to direct electrical current to solenoid valve 230 in order to control the amount of air permitted to pass into the ball raceway 262.

In FIG. 4, instead of an internal battery power source, a wire 400 may provide electric power to the electrical circuitry. Sensors 460 and 462 may be operable to detect a shift in orientation of target object 100. In some embodiments, the sensors may be a plurality of accelerometers, a plurality of gyroscopes, or a combination of sensors. Any other known or to be discovered sensors are contemplated within the disclosure in order to achieve the desired functions of control system. Furthermore, any known or to be discovered circuitry or arrangement of the components of PCB 410 are contemplated within the disclosure in order to achieve the desired functions of control system as described herein. Extractor system is placed on the surface of target object 100 proximally to unsecured interface 120. Prior to target object 100 being released from base surface 126, adhesive 124 keeps target object 100 adhered to base surface 126.

Various adhesives may be provided to achieve the desired functions of holding oscillator to target object. Hot melt glues may be provided, as well as adhesives resilient to tensile forces, but weak to shear forces. Any known or to be discovered adhesives are contemplated within the disclosure. Non-target objects 102 may be adjacent to target object 100, and may be unsecured or independent from target object 100 after removal of adjacent sealant 110. Adjacent sealant may remain intact 128, but be uncoupled from target object.

Further embodiments of extractor system may use air pressure to exert lifting force in control system.

Still further embodiments of the extractor system may include an attenuator placed between target object and adjacent non-target objects to achieve the achieve the desired function of extractor system described herein. An attenuator may be a damper, bumper, isolator, or vibrational insulator adapted to limit the transmission kinetic energy resulting from repetitive impacts between the target object and adjacent non-target objects. Attenuation of vibrational forces may reach near zero transmission beyond target object through isolation of vibrational force to target object.

A general purpose computer may be provided capable of programmatically controlling application of oscillation forces to the target object through selective direction, intensity, frequency, application of location, or duration, or any combination thereof. The general purpose computer may also be adapted to record and store information provided by sensors and monitors, such as various states of the extractor system or various states of the target object. Machine learning may be employed to optimize oscillation forces, including collecting and analyzing data about various states of a particular kind of target object, or across different kinds of target objects. A combination of oscillators may be controlled by the control system and programmed. The oscillation forces may be steady in amplitude and frequency, or may be varied over the course of time. Data collection and analysis to optimize the efficiency of extractor system when used on varying target objects is also contemplated by the disclosure. Efficiency may include minimization of damage to target objects, minimization of energy required to effectuate removal of a target object, or minimization of time required to achieve unbonding of a target object from a substrate. A general purpose computer may also permit a user to directly control extractor system rather than through automated software control or pre-determined operating routines.

Other embodiments of the attachment base may include a clamping device to hold the lateral edges of target object, applying clamping forces to target object 100 through any combination of opposing grips, stops, or clamps to which an oscillator may be attached. Any known or to be discovered clamping systems are contemplated within the disclosure.

Figure 5:
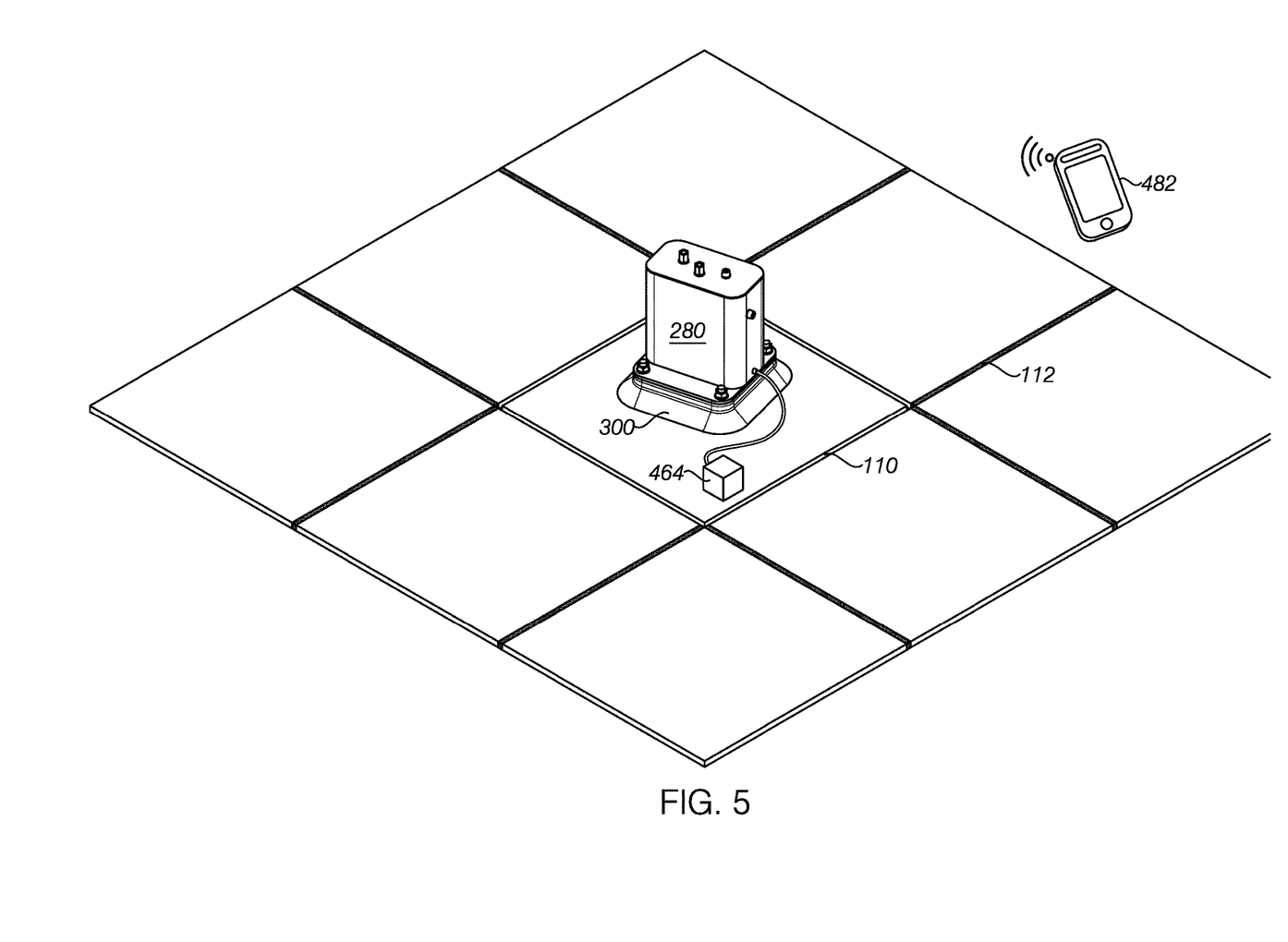
FIG. 5 illustrates a perspective view of an extractor system placed atop a target finish covering within a field of adjacent finish covering, and controlled remotely.

Turning to FIG. 5, an embodiment of the extractor system is provided in accordance with the disclosure. Extractor system may include a sensor 464 located a distance from oscillator 280 and attachment base 300. Sensor 464 may be electrically connected to oscillator 280 and attachment base 300 via a wired connection, or wirelessly. Additional embodiments may include multiple monitors. User control of the extractor system may be achieved through wireless communication from remote 482. Components and functions of the control system may be physically separate from each other such as between extractor system and a user remote. Remote 482 may include a general purpose computer adapted to accomplish various functions described herein. Remote need not be in proximity to oscillator, and could be at very far distances, adapted to communicate via the Internet.

Figure 6:
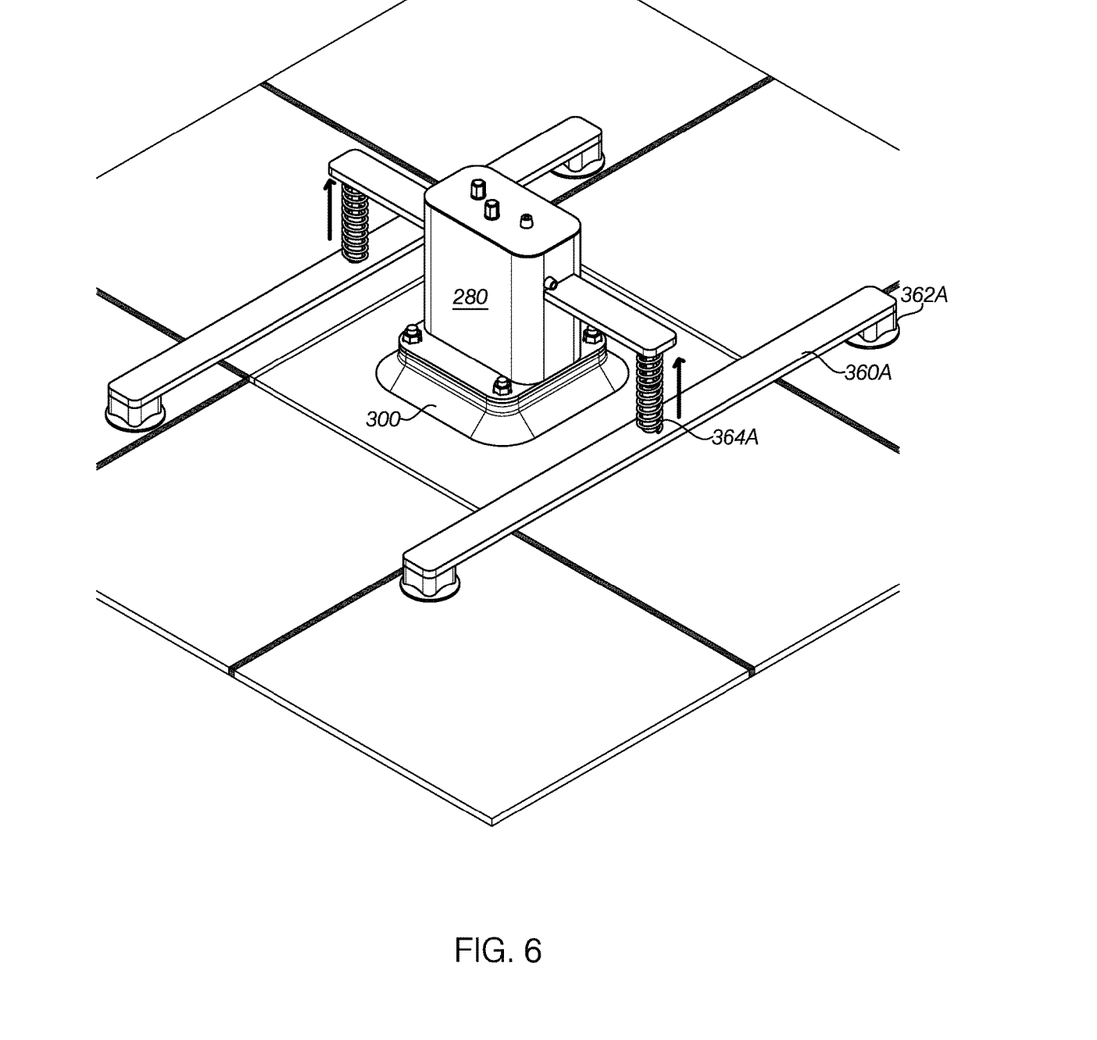
FIG. 6 illustrates a perspective view of another embodiment of an extractor system with mechanical lifting-based control system employing another form of a gantry.
Figure 6A:
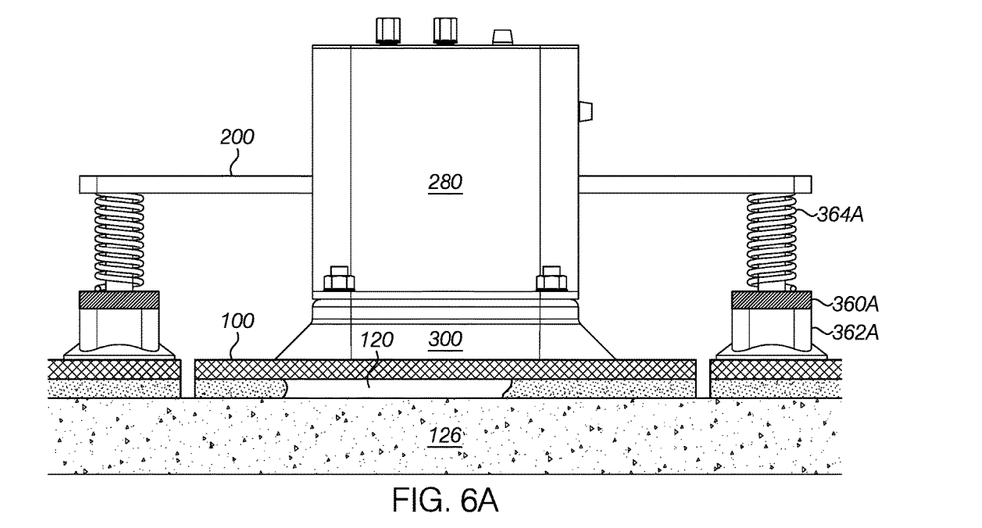
FIG. 6A illustrates a lateral cross sectional view of FIG. 6 illustrating placement of an extractor system before a target object has become unsecured from a base surface.
Figure 6B:
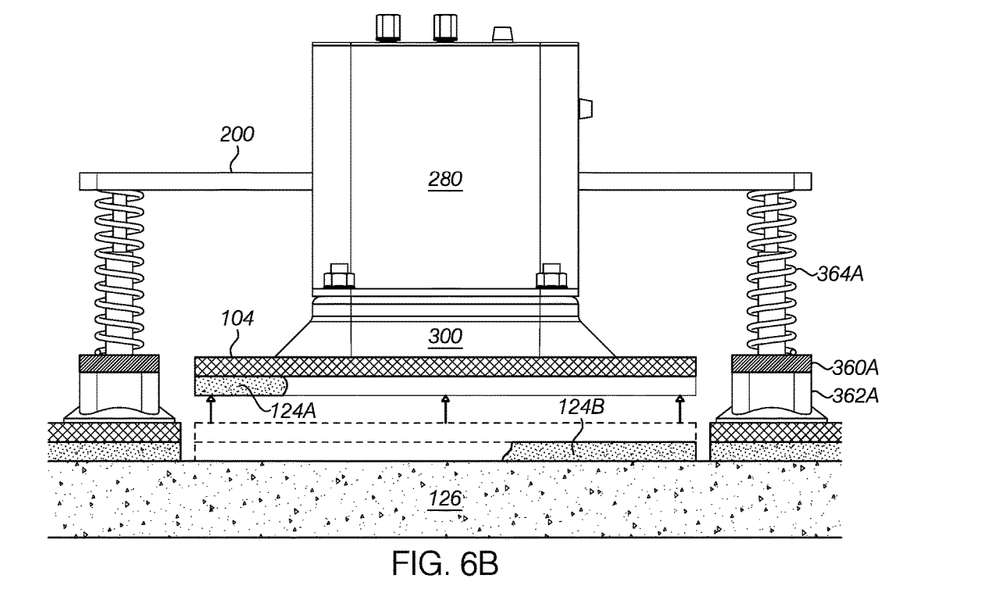
FIG. 6B illustrates a lateral cross sectional view of FIG. 6 illustrating uplift of a target object, intact and undamaged, together with the vibrational source, away from adjacent objects and away from a base surface.

FIGS. 6, 6A, and 6B present another embodiment of the extractor system in accordance with the disclosure. Extractor system may alternatively provide for springs 364A under compression between housing and cross member 360A. Lateral supports 362A may be dimensioned to accommodate the uplift of target object 100 so as to clear the proximate area adjacent to target object such that if vibratory forces are being applied to target object, target object moving independent of base surface will not impact adjacent objects or impact lifting device. FIG. 6A provides a lateral crossectional view of extractor system while target object 100 remains secured to base surface 126. FIG. 6B provides a lateral crossectional view of extractor system after target object 100 has become unsecured 104 from base surface 126. As a result of the extraction process, adhesive 124A may remain attached to target object or adhesive 124B may remain attached to base surface 126. The disclosure contemplates that the fixative material 124 may remain entirely on extracted target object 104, remain entirely on base surface 126, or any combination thereof.

Figure 7:
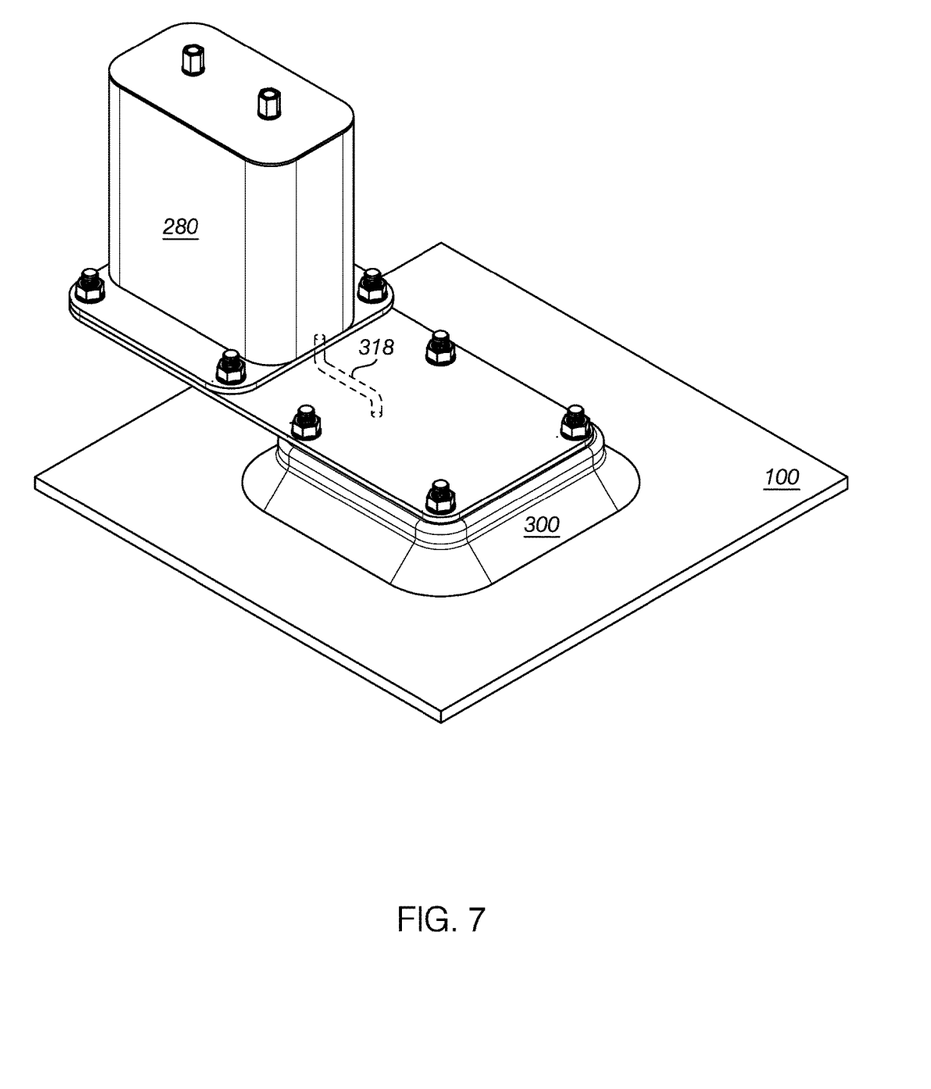
FIG. 7 illustrates a perspective view of another embodiment of an oscillator, in accordance with the disclosure, positioned in a different orientation relative to the attachment base.

FIG. 7 presents an embodiment of the extractor system in accordance with the disclosure. Extractor system may provide for placement of oscillator 280 at a distance from attachment base 300. Adjusting the orientation of the oscillator relative to the attachment base provides for flexibility in modifying how vibrational forces from the oscillator 280 are transmitted through the attachment base 300 and into target object 100. Variations in the positioning of the oscillator and relative distances between it and the attachment base are envisioned to enhance, attenuate, or otherwise modify the vibrational waves transmitted into the target object. An oscillator may be operably connected to attachment base through conduit 318.

Figure 8A:
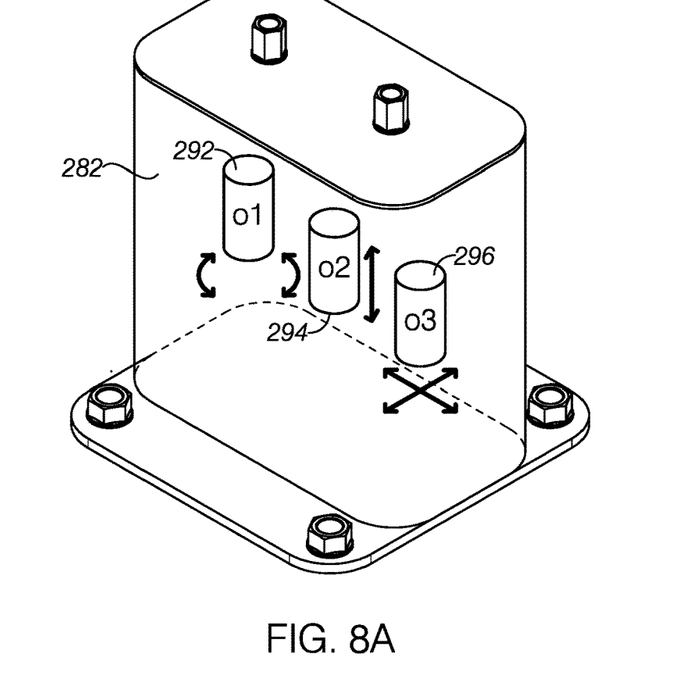
FIG. 8A illustrates a perspective view of an embodiment of an oscillator, the outer housing of the oscillator shown transparently so as to illustrate conceptually how the device may include multiple oscillators ($O_1, O_2, O_3 \ldots O_n$) with varying output of oscillation forces.
Figure 8B:
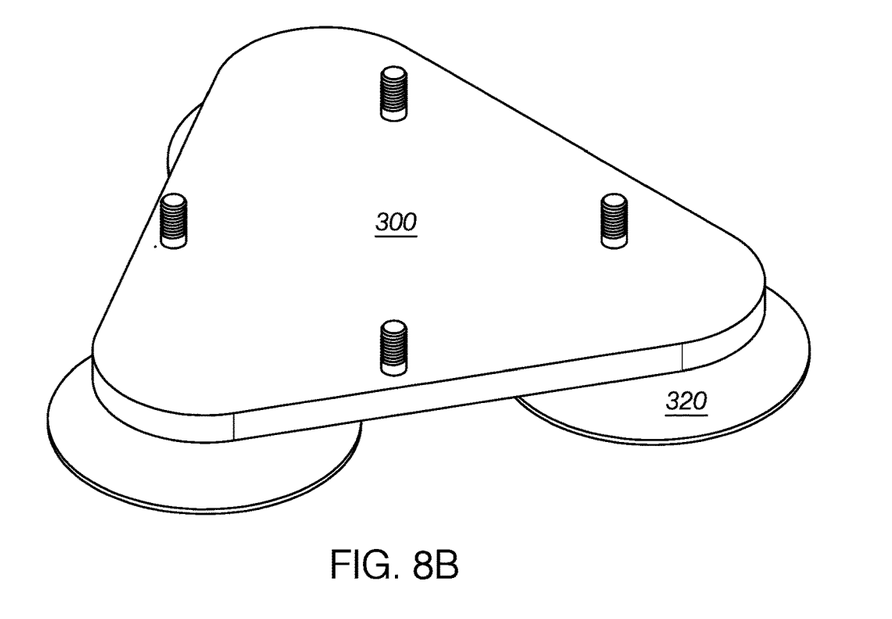
FIG. 8B illustrates a perspective view of an embodiment of an attachment base so as to illustrate conceptually how the attachment base may include multiple attachment points.

FIGS. 8A and 8B present an embodiment of the extractor system in accordance with the disclosure. Extractor system may provide for a plurality of oscillators 282. Oscillators with varying directional force outputs, including rotational oscillator 292, vertical oscillator 294, or lateral oscillator 296 may be provided in various combinations so as to control the application of repetitive force relative to a target object. FIG. 8B illustrates an embodiment of the attachment base wherein multiple independent points of contact 320 may engage and hold the oscillator to a target object. Varying combinations of types of attachment bases and multiple types of oscillators are contemplated within the disclosure to achieve the desired function of extractor system described herein.

Figure 9A:
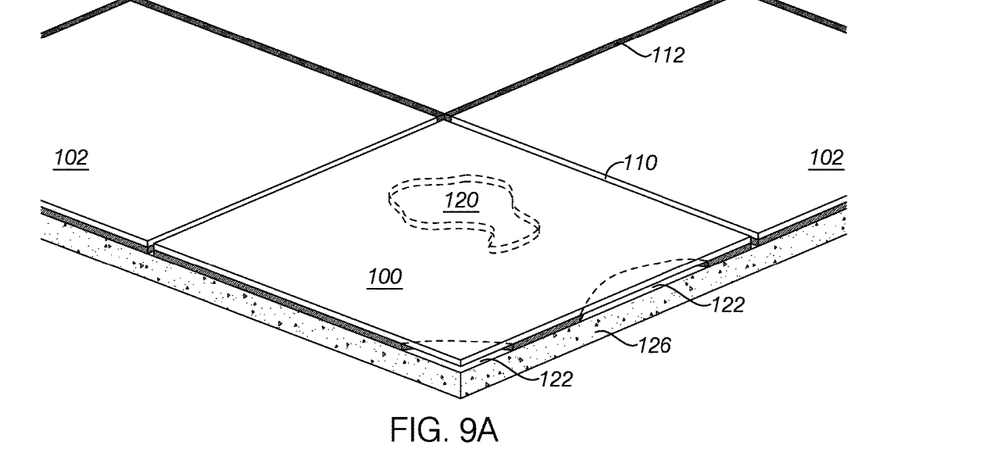
FIG. 9A illustrates a perspective view of an embodiment of a target object, in accordance with the disclosure, illustrating areas where a target object is disassociated from adjacent objects, and illustrating areas beneath the target object where it is partially unsecured from the base surface.
Figure 9B:
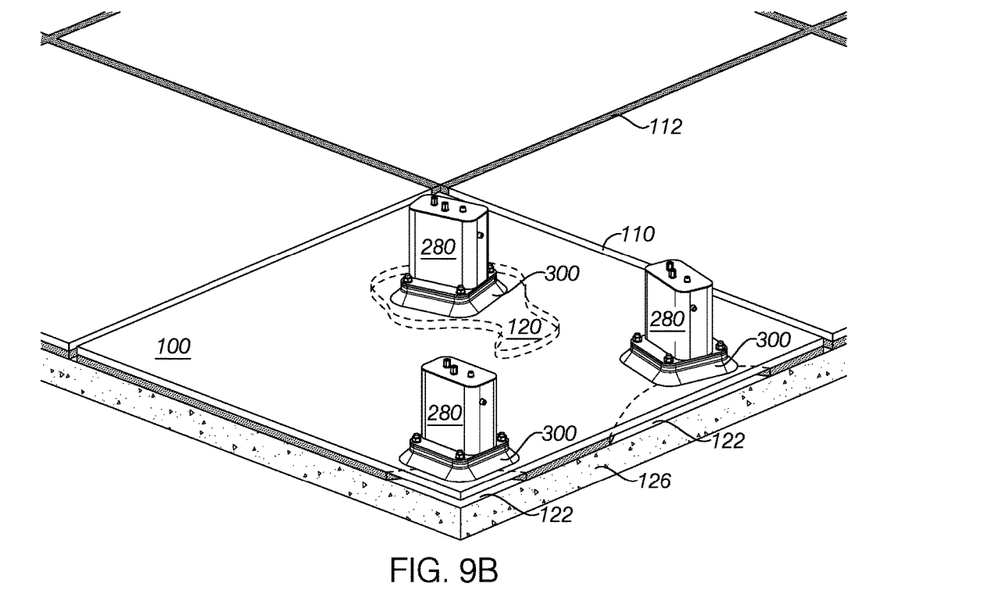
FIG. 9B illustrates a perspective view of an embodiment of method of unsecuring a target object from a base surface, in accordance with the disclosure, illustrating placement of multiple extractor systems placed in proximity to areas beneath the target object where it is partially unsecured from the base surface.

FIGS. 9A and 9B present an embodiment of the method of extracting a target object in accordance with the disclosure. Target object 100 may include an interface 120 where it is not completely secured to base surface 126. Interface areas 122 between target object and base surface may be created to partially unsecure target object from base surface. Methods of creating interface areas 122 may include unbonding, removing, ablating, etching, cutting, or otherwise causing detachment of the target object from the base surface near an edge of target object. A plurality of non-target objects 102 may be in proximity to the target object. Oscillators 280 with attachment bases 300 may be placed proximally to areas where the target object is not completely secured to the base surface and operated to achieve removal of the target object from the base surface. It is contemplated that individual extractor systems may work independently, collectively, in groups, alternating, synergistically, antagonistically, or any combination thereof, to achieve the desired functions of the extractor system. Individual extractor systems may also communicate with each other through their individual control systems, or through a master control system.

Figure 10:
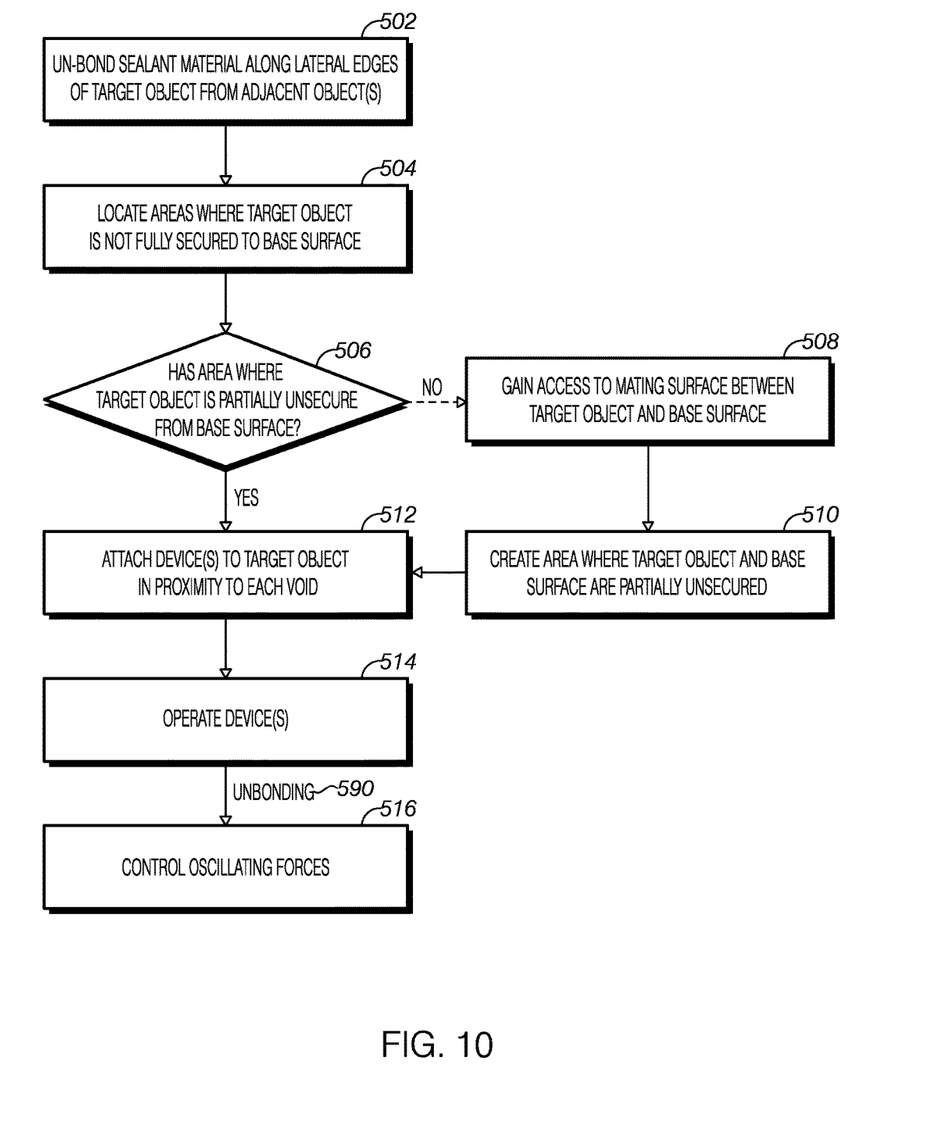
FIG. 10 illustrates a flow chart diagram of an embodiment of a method of unsecuring a target object from a base surface.

FIG. 10 illustrates an embodiment of the method of extracting a target object in accordance with the disclosure. The method may include isolating 502 target object from a plurality of adjacent non-target objects by unbonding sealant material along some of the edges of target object. Unbonding may be achieved by cutting, etching, ablating, removing, or otherwise ensuring that the lateral edges of target object are not adhered to any adjacent objects. A second step of the method might comprise identifying 504 areas where target object is not fully secured to base surface, such as manually looking for or testing target object for weakened interface areas. Where target object has no suitable interface areas, a weakened interface area may be created by destroying 510 part of the join between the target object and the base surface. The method may then include placing and attaching 512 one or more extractor systems to target object proximally to areas where the join between the target object is weak or partially destroyed. Once attached, oscillators are operated 514 to transmit vibrational forces into target object for a sufficient period of time until unbonding 590 of the target object occurs. The process of unbonding may be monitored while oscillation forces are being applied to the target object. After target object has become unsecured from the base surface, oscillating forces are controlled 516. Steps for controlling vibrational waves may include placing bumpers or attenuators between the target object and adjacent non-target objects, lifting target object away from base surface, or oscillator may be stopped.

In another embodiment, control of oscillation forces may be achieved by a user visually monitoring the target object and manually terminating power supplied to the oscillator.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

What is claimed:

1. An extractor system for removing a rigid target object adhered to a surface through vibration comprising:
   at least two attachment bases, each attachment base comprising a plate and a suction cup, the plate having a first side and a second side, the first side adapted to hold the suction cup, the suction cup adapted to generate a vacuum suction force between the plate and a target object;
   an oscillator connectable to the second side of the plate of one of the at least two attachment bases, wherein the oscillator transmits oscillating forces through the one of the at least two attachment bases and into the target object; and
   a lifting device comprising
      a gantry having at least two surface-engaging supports and a cross member held therebetween, the gantry dimension to span the cross member above the at least two attachment bases; and
      at least two springs, each spring in mechanical communication with the cross member and one of the at least two attachment bases, wherein each spring is adapted to apply tension between the crossmember and one of the at least two attachment bases.

* * * * *